United States Patent
Yerli

(10) Patent No.: US 11,165,596 B2
(45) Date of Patent: Nov. 2, 2021

(54) SYSTEM AND METHOD FOR INVITING USERS TO PARTICIPATE IN ACTIVITIES BASED ON INTERACTIVE RECORDINGS

(71) Applicant: TMRW FOUNDATION IP S. À R.L., Luxembourg (LU)

(72) Inventor: Cevat Yerli, Frankfurt am Main (DE)

(73) Assignee: TMRW Foundation IP S. À R.L., Luxembourg (LU)

( * ) Notice: Subject to any disclaimer, the term of this patent is extended or adjusted under 35 U.S.C. 154(b) by 449 days.

(21) Appl. No.: 14/532,843

(22) Filed: Nov. 4, 2014

(65) Prior Publication Data

US 2016/0127288 A1 May 5, 2016

(51) Int. Cl.
H04L 12/18 (2006.01)
A63F 13/40 (2014.01)
A63F 13/30 (2014.01)

(52) U.S. Cl.
CPC .......... *H04L 12/1831* (2013.01); *A63F 13/40* (2014.09); *A63F 13/30* (2014.09); *H04L 12/1818* (2013.01)

(58) Field of Classification Search
CPC ...... A63F 13/30; A63F 13/40; H04L 12/1831; H04L 12/1818
See application file for complete search history.

(56) References Cited

U.S. PATENT DOCUMENTS

| 7,356,830 B1 * | 4/2008 | Dimitrova | G06F 16/748 |
| | | | 725/51 |
| 7,819,749 B1 * | 10/2010 | Fish | A63F 13/5375 |
| | | | 463/42 |

(Continued)

FOREIGN PATENT DOCUMENTS

| CN | 102223449 A | 10/2011 |
| CN | 102933267 A | 2/2013 |

(Continued)

OTHER PUBLICATIONS

Office Action dated Feb. 26, 2018, issued in corresponding Chinese Application No. 201510735975.3, filed Nov. 3, 2015, 19 pages.

(Continued)

*Primary Examiner* — Uzma Alam
(74) *Attorney, Agent, or Firm* — Christensen O'Connor Johnson Kindness PLLC

(57) ABSTRACT

A method for inviting users to participate in activities comprises receiving from a first client device a recording of at least a part of an activity provided via the first client device to a first user and one or more parameters related to a configuration of the activity on the first client device, embedding an interactive element into the recording of the activity, thereby generating an invitation to participate in the activity, wherein the invitation is published. The method further comprises receiving from a second client device an indication of an interaction of a second user with the embedded interactive element, and providing the one or more parameters for initiating the activity on the second client device according to the configuration. Furthermore, a system enabling inviting of users to participate in activities and a corresponding client device are defined.

26 Claims, 8 Drawing Sheets

(56) References Cited

U.S. PATENT DOCUMENTS

| | | | | |
|---|---|---|---|---|
| 8,131,270 | B2* | 3/2012 | Rao | G06Q 30/0267 455/414.1 |
| 8,346,801 | B2* | 1/2013 | Hagg | G06F 16/70 707/772 |
| 8,425,325 | B2* | 4/2013 | Hope | G06F 16/4393 463/42 |
| 8,782,122 | B1* | 7/2014 | Chang | H04L 67/1048 709/202 |
| 9,443,147 | B2* | 9/2016 | Mei | H04N 21/4622 |
| 9,459,761 | B2* | 10/2016 | Bedingfield, Sr. | G06F 3/04842 |
| 9,658,994 | B2* | 5/2017 | Sipe | G06F 16/435 |
| 9,679,303 | B1* | 6/2017 | Griffin | G06Q 30/0214 |
| 2004/0168206 | A1* | 8/2004 | Stienstra | G06F 3/0481 725/139 |
| 2005/0108383 | A1* | 5/2005 | DeHaas | G06Q 10/00 709/224 |
| 2005/0193417 | A1* | 9/2005 | Bankers | H04N 21/47 725/60 |
| 2007/0077997 | A1* | 4/2007 | Johnson | G07F 17/3227 463/42 |
| 2008/0146342 | A1* | 6/2008 | Harvey | A63F 13/352 463/42 |
| 2008/0243853 | A1* | 10/2008 | Reding | H04L 51/28 |
| 2009/0144369 | A1* | 6/2009 | Brown | G06F 16/9535 709/205 |
| 2009/0235182 | A1* | 9/2009 | Kagawa | G06F 16/954 715/753 |
| 2010/0110912 | A1* | 5/2010 | Wang | H04B 7/022 370/252 |
| 2010/0153861 | A1* | 6/2010 | Henshaw | G06Q 30/02 715/758 |
| 2010/0269044 | A1* | 10/2010 | Ivanyi | H04L 41/5067 715/736 |
| 2010/0293059 | A1* | 11/2010 | Davison | G06Q 30/02 705/14.69 |
| 2013/0110565 | A1* | 5/2013 | Means, Jr. | G06Q 10/063 705/7.11 |
| 2013/0244785 | A1* | 9/2013 | Gary | A63F 13/497 463/42 |
| 2013/0254806 | A1* | 9/2013 | Alam | H04N 21/482 725/38 |
| 2013/0262564 | A1* | 10/2013 | Wall | H04N 21/812 709/203 |
| 2013/0275531 | A1* | 10/2013 | Hahm | H04L 67/30 709/206 |
| 2013/0281194 | A1* | 10/2013 | Johnson | G07F 17/3227 463/25 |
| 2013/0302018 | A1* | 11/2013 | Jiang | H04N 5/783 386/286 |
| 2013/0346876 | A1* | 12/2013 | Yerli | H04L 65/403 715/753 |
| 2014/0038721 | A1* | 2/2014 | Archer | A63F 13/48 463/42 |
| 2014/0088980 | A1* | 3/2014 | Mahafzah | G16H 40/67 705/2 |
| 2014/0098176 | A1* | 4/2014 | Isaacs | H04L 67/20 348/14.01 |
| 2014/0113718 | A1* | 4/2014 | Norman | A63F 13/497 463/31 |
| 2014/0118474 | A1* | 5/2014 | Fluhr | H04N 7/152 348/14.09 |
| 2014/0172965 | A1* | 6/2014 | Yerli | G06O 50/01 709/204 |
| 2014/0364228 | A1* | 12/2014 | Rimon | A63F 13/497 463/32 |
| 2014/0380380 | A1* | 12/2014 | Heller | H04N 21/47217 725/58 |
| 2015/0128017 | A1* | 5/2015 | Fithian | G06F 40/134 715/205 |
| 2015/0367238 | A1* | 12/2015 | Perrin | A63F 13/30 463/29 |

FOREIGN PATENT DOCUMENTS

| | | | | |
|---|---|---|---|---|
| CN | 103902808 A | | 7/2014 | |
| CN | 103977560 A | | 8/2014 | |
| WO | WO 2013163205 A1 | * | 10/2013 | A63F 13/86 |
| WO | WO-2013163205 A1 | * | 10/2013 | A63F 13/12 |

OTHER PUBLICATIONS

Office Action dated Feb. 22, 2019, issued in corresponding Chinese Application No. 201510735975.3, filed Nov. 3, 2015, 18 pages.
Office Action dated Aug. 8, 2019, issued in corresponding Chinese Application No. 201510735975.3, filed Nov. 3, 2015, 23 pages.

* cited by examiner

SYSTEM AND METHOD FOR INVITING USERS TO PARTICIPATE IN ACTIVITIES BASED ON INTERACTIVE RECORDINGS

TECHNICAL FIELD

The present disclosure relates to a method for inviting users to participate in activities and, in particular, to invitations based on interactive recordings of activities. Moreover, the disclosure relates to a system hosting an online service and a client device enabling invitations of users to participate in activities.

BACKGROUND

Inviting users to participate in activities, such as computer-based activities, is not a new phenomenon. For example, a user or host involved in a computer-based activity can invite other users or guests to participate in the computer-based activity. As an example, a host playing a video game may challenge or invite guests to play the video game. For example, the corresponding functionality can be found on current game consoles. However, in present approaches, both guests and hosts are limited in that they are only able to join up with or invite known users. Hence, the possibility of inviting someone to play along with the host or to challenge someone who is unknown to the user does not currently exist. Current approaches for inviting guests also require several steps which are to be performed by the user and potential guests in order to accept the invitation. Such approaches are difficult to use.

Accordingly, at least one object of the present disclosure is to simplify invitations of users to participate in activities. In particular, an object is to provide an easy to use and fast mechanism to directly accept invitations and initiate activities according to the invitation.

SUMMARY AND INITIAL DESCRIPTION

The above problem is solved by a method for inviting users to participate in activities, a system hosting an online service, and a client device enabling invitations of users to participate in activities as defined in the independent claims. Preferred embodiments are defined in the corresponding dependent claims.

According to a first aspect of the present disclosure, a method for inviting users to participate in activities is provided, said method comprising receiving from a first client device a recording of at least a part of an activity provided via the first client device to a first user and one or more parameters related to a configuration of the activity on the first client device. An interactive element is embedded into the recording of the activity to thereby generate an invitation to participate in the activity, wherein the invitation is published. The method further comprises receiving from a second client device an indication of an interaction of a second user with the embedded interactive element, and providing the one or more parameters for initiating the activity on the second client device according to the configuration.

The method, which is preferably a computer-implemented method, enables the first user or a host to invite other users, such as the second user or further guests, to participate in the activity based on a recording of at least a part the activity that is recorded during the participation of the first user in the activity on the first client device. Said recording can be explicitly initiated by the first user, for example, by issuing a single command to invite other users or implicitly based on a behavior of the first user during the activity. The recording of the activity may be enriched with an embedded interactive element and made available to other users. At least one of the other users may accept the invitation by interacting with the embedded interactive element, which will automatically trigger an initiation of the activity for the second user. Hence, the method provides for a direct and efficient invitation of users and a simplified confirmation process to join or individually participate in the activity based on the invitation.

The term "activity" as used throughout this disclosure refers to computer-based activities which are provided to a user via a client device, such as a computing device. The activities may be online activities executed on a remote server or local activities executed locally on the client device. Computer-based activities can be, for example, games or video games. However, the present disclosure is not limited to games only and other online or local computer-based activities provided to users via respective client devices are also encompassed by the present disclosure, such as applications, communication applications, and collaborative processing of data, content, or media.

Individual method steps can be preferably executed on a processing component of a system or an online service, which may be connected to individual client devices via one or more networks to receive and provide respective data to the client devices.

The parameters received with the recording of the activity define the configuration of the activity, such as a current state of the activity and/or individual configuration parameters of the activity, which parameters can be used to initiate the activity or another instance of the activity on another client device in substantially the same state and/or with substantially the same configuration as on the first client device. Hence, preferably the initial state of the activity provided via the second client device can be comparable to the initial state of the activity provided via the first client device. This enables participation in substantially the same or at least similar activities for all involved and invited users, such as the first and second users. However, preferably the parameters may also be used to configure the activity on the second client device in a way that corresponds to a last state and configuration of the activity on the first client device. According to this setting, the second user may carry on the activity or work as finished by the first user.

According to a preferred embodiment of the present disclosure, the method further comprises continuously feeding back data to the first user, the data being related to the activity provided via the second client device to the second user. The first user can be provided with data that may reflect a state of the activity on the second client device, such as a current performance of the second user or a current configuration of the activity on the second client device. This is advantageous since the first user may directly track the participation of the second user in the activity and may be kept up to date about the performance of the second user.

In a further embodiment of the present disclosure, the invitation is published to one or more further users according to an identification of the one or more further users provided by the first user. The first user may initiate the recording of at least a part of the activity on the first client device, preferably either explicitly by interacting with a user interface of the first client device, for example, by clicking on a button or by issuing a speech command, or implicitly based on a history and current performance of the user in the activity, in order to generate the recording of at least a part of the activity. The recording is used to generate the invitation and the first user may either choose to publish the invitation to an unrestricted group of other users or may decide to identify the group of other users. The identification may be achieved by selecting individual users, for example, by using contacts of the first user or by specifying a group of other users, such as indicating a group of friends or a group of users with a certain attribute, for example, as defined in a social network. This identification of the one or more further users can be linked to the invitation in order to control the group of recipients of the publication. This is advantageous since the user can control the publication process of the invitation on a more detailed scale.

In a further embodiment of the present disclosure, the method further comprises receiving from the second client device a further recording of at least a part of the activity provided via the second client device to the second user and one or more further parameters related to a further configuration of the activity on the second client device. The further recording and the further parameters may reflect the performance of the second user in the activity on the second client device. The further parameters may reflect an improved performance of the second user or a further progress of the activity achieved by the second user, which performance may be comparable to the performance of the first user.

In yet another embodiment of the present disclosure, the method further comprises embedding an interactive element into the further recording of the activity, thereby generating a further invitation to participate in the activity. Preferably, the further invitation is published at least to the first user. This allows for a closed loop of invitations, wherein each user may contribute to the activity or repeat an activity to, for example, improve his or her personal performance in the activity. The further invitation may be processed substantially in the same way as the invitation generated for the first user, which may lead to a continuous loop of invitations reflecting the participation of individual users in the activity. This is advantageous since each user accepting an invitation may automatically invite further users, thereby extending a network of potential participants.

According to yet another embodiment, the method further comprises receiving from the first client device an indication of an interaction of the first user with the embedded interactive element, and providing the one or more further parameters for initiating the activity on the first client device according to the further configuration.

In a preferred embodiment of the present disclosure, the method further comprises continuously feeding back data to the second user, the data being related to said activity provided via the first client device. This provides for a closed loop of two participants in the activity. However, it is to be understood that the invitations can also be published to a group of users or an unrestricted amount of users that may accept the invitation and participate in the activity and generate further invitations to participate in the activity that can be processed according to the present disclosure.

For example, according to a preferred embodiment of the present disclosure, the method may further comprise receiving from a third client device an indication of an interaction of a third user with the embedded interactive element, providing the one or more parameters for initiating the activity on the third client device according to the configuration, receiving from the third client device a third recording of at least a part of the activity provided via the third client device to the third user and one or more third parameters related to a third configuration of the activity on the third client device, and embedding an interactive element into the third recording of the activity, thereby generating a third invitation to participate in the activity. Hence, by publishing the invitation to a plurality of users and accepting the invitation by respective users, the activity or instances of the activity may be provided via respective client devices, such as the first, second, or third client devices to individual users, such as the first, second, and third user, respectively, which, in turn, may feed back respective invitations to other users, thereby generating a "viral" network of invitations, wherein individual participation of users in the activity are documented using respective recording of the activity on respective client devices.

In a further embodiment of the present disclosure, the activity on the client device, such as the first and/or second and/or third or any further client device, is continuously recorded and the respective recording of the activity is generated based on the continuous recording responsive to the user, such as the first and/or second and/or third or any further user, achieving at least one goal of the activity. Preferably, the at least one goal includes achieving a personal best of the respective user. The activity may, for example, be configured to monitor a previous performance of the user, which may be stored and compared to a current performance of the user. Preferably, the activity may be a game and the goal may be defined as achieving a personal best score of the user. The achievement of the at least one goal may automatically trigger the generation of the recording of the activity, which may be directly transmitted by the client device for further processing. The continuous recording of the activity can be temporarily stored and, as soon as the user achieves the goal, the continuous recording can be limited to a pre-defined time range to generate the recording.

In a preferred embodiment of the present disclosure, said one or more parameters reflect the state of the activity during achievement of the at least one goal. The configuration of the activity during achievement of the goal and/or the initial configuration and/or at the beginning of the pre-defined time range can be analyzed, processed, and transmitted together with the recording for further processing.

In at least one embodiment of the present disclosure, said publishing includes distributing the invitation via one or more channels or networks to one or more further users. The channels or networks may include any publishing means, such as a publishing network or an online service, such as a social network. Additionally or as an alternative, the channels or networks may also include individual communication channels between client devices of the users.

According to at least one embodiment, the invitation includes the recording of the activity. The recording may be processed, encoded, and/or compressed, enriched with the embedded interactive element, and included into the invitation that may be thereafter uploaded to a publishing network or an online service, such as a social network, or otherwise distributed for further publishing.

In a preferred embodiment of the present disclosure, the recording of the activity is stored in an online database. Preferably, the invitation may include a link to the recording in the online database. The link may allow a direct retrieval of the recording with the embedded interactive element. This is advantageous since the size of the invitation can be limited and the stored recording can be used in subsequent invitations without requiring re-sending of the recording. During publishing, the publishing system may retrieve the recording with the embedded interactive element from the database and provide the retrieved data.

In a further embodiment of the present disclosure, the activity is provided using a toolkit, said toolkit providing functionality for continuous recording of the activity. Accordingly, the toolkit, such as a software development kit (SDK), an execution framework, or an engine, may provide the activity and continuously record any performance in the activity.

In yet another embodiment of the present disclosure, the interactive element is configured to provide direct access to the activity for a user interacting with the interactive element. The user interacting with the interactive element can be, for example, the first, the second, or the third user and/or any further user capable of accessing the published invitation, including the recording of the activity and the embedded interactive element. This is advantageous since the user accepting the invitation does not need to perform various confirmation and initiation steps in order to start the activity on the client device, but can confirm the participation and directly access the activity by using the interactive element. The interactive element can be an element of a user interface, such as a button or any other component of the user interface suitable to create a link between the invitation and the activity. However, the interactive element can also be responsive to any other modality, such as responsive to an acoustic or haptic input. By interacting with the interactive element, the client device may retrieve the parameters associated with the invitation using the interactive element, such as by authenticating at a system hosting the invitations using the link and receiving the parameters to locally initiate the activity according to the configuration as defined by the parameters.

In yet another preferred embodiment, the method further comprises receiving from the provider of the activity one or more definitions of goals of the activity and providing said definitions to the respective client device providing the activity, such as the first or second client device. The provider of the activity may specify a plurality of goals that are suitable to automatically generate an invitation to participate in the activity. These definitions can be centrally stored and provided to each client device that provides the activity. The client device can be configured to receive the definitions of goals and automatically trigger generation of the recording of the activity in response to achieving one or more of the goals.

In a preferred embodiment of the present disclosure, the method further comprises providing a communication platform linked to the published invitation. The published invitation may include the recording and the embedded interactive element. The communication platform may connect at least the first and second users, or any user participating in the activity and the plurality of further users observing the published application. Said publishing of the recording may be performed by posting the recording via an online service, such as a publishing system or a social network, or by variously announcing the invitation represented referring to the recording via the online service. The posting or announcement can be embedded within a user interface that may also represent the communication platform for the first user, the second user, or any other further user. Hence, any user who may observe the published invitation may also directly initiate a communication via the communication platform with the initiating user and other users observing the published invitation. The communication may be a dedicated communication channel between two users or may be a group communication, such as a chat or any other communication activity provided via the online service.

In yet another preferred embodiment of the present disclosure, the method further comprises providing code related to the activity to a client device wherein the code is executable on the client device to provide the activity. The code may be, for example, distributed as a computer program product including at least one non-transitory computer-readable medium. The code may be installed and executed on the client device in order to provide the activity. However, the code may also be downloaded from a server, stored locally on the client device, and executed in order to provide the activity. For example, the client device may connect to an online service that may provide access to various activities, such as games or any other activity, and responsive to a request, the online service may enable a download of respective code to the client device to be executed on the client device in order to provide the activity.

According to yet another preferred embodiment, the activity on the respective client device, such as the first or second client device, is provided via an online service. Hence, the client device may be a thin client that may only provide dedicated functionality capable of connecting to the online service in order to provide the activity.

In a preferred embodiment of the present disclosure, the method further comprises executing, for a respective client device, the activity on the online service and streaming output of the executed activity to the respective client device. The online service may provide execution environments for connected client devices that may be used to execute activities for the client devices online. The execution environment may be provided by and/or the activity may be executed on a processing component of the online service, such as a dedicated server. The client device may connect to the online service that may redirect the client device to the execution environment on the processing component. The output of the executed activity can be directly streamed to the client device. The client device may directly provide any input of the user to the execution environment on the processing component, such that the user input on the client device is processed as input to the activity executed in the execution environment. This is advantageous since the code required to execute the activity can be kept within the online service and does not need to be distributed to individual client devices.

According to a further aspect, a non-transitory computer-readable medium having instructions stored thereon is provided, wherein said instructions, in response to execution by a computing device, cause said computing device to automatically perform a method for inviting users to participate in activities according to embodiments of the present disclosure. In particular, the instructions may cause said computing device to automatically perform a method including the steps of receiving from a first client device a recording of at least a part of an activity provided via the first client device to a first user and one or more parameters related to a configuration of the activity on the first client device, embedding an interactive element into the recording of the activity, thereby generating an invitation to participate in the activity, wherein the invitation is published, receiving from a second client device an indication of an interaction of a second user with the embedded interactive element, and providing the one or more parameters for initiating the activity on the second client device according to the configuration.

According to yet another aspect of the present disclosure, a system comprising one or more computing devices linked to each other via a network is provided, said system hosting an online service enabling inviting users to participate in activities, wherein the one or more computing devices are configured to receive from a first client device a recording of at least a part of an activity provided via the first client device to a first user and one or more parameters related to a configuration of the activity on the first client device, embed an interactive element into the recording of the activity to thereby generate an invitation to participate in the activity, wherein the invitation is published, receive from a second client device an indication of an interaction of a second user with the embedded interactive element, and provide the one or more parameters for initiating the activity on the second client device according to the configuration.

The system provides for an efficient processing of invitations for various users in order to enable a direct participation in activities in response to an interaction with the invitation, which may require, for example, only a single click on the interactive element embedded in the recording of the activity. Hence, the system greatly simplifies the invitation process and involvement in computer-based activities.

According to a preferred embodiment, the system further comprises an online database, wherein the recording of the activity is stored in the online database. Preferably, the invitation may include a link to the recording in the online database, which may be used to retrieve the recording for subsequent publishing of the invitation with the recording and the embedded interactive element.

In yet another embodiment of the present disclosure, the online service is a gaming platform enabling access to a plurality of games. The activities can be games or video games and the individual users of the gaming network may invite other users to participate in the game and/or may challenge other users to beat their personal best.

According to various embodiments of the present disclosure, the system can be configured to perform the functionality as defined in embodiments of the method for inviting users to participate in activities according to the present disclosure in any combination.

According to yet another aspect of the present disclosure, a client device enabling inviting users to participate in activities is provided, wherein the client device is configured to provide an activity to a user, send to an online service a recording of at least a part of the activity and one or more parameters related to a configuration of the activity on the client device, receive, from the online service, an invitation to participate in the activity referring to the recording of the activity and having an embedded interactive element, and publish the invitation, wherein the activity is initiated on a further client device according to the configuration responsive to an indication of an interaction of a further user with the embedded interactive element on the further client device.

The client devices according to embodiments of the present disclosure may be a computing device, a dedicated hardware device, or a thin client, such as a computer, a laptop, a mobile device, a smartphone, a gaming console, a smart TV device, and/or set-top box and similar stand-alone or networked computing devices.

According to further preferred embodiments of the client device, the client device may reflect the functionality as defined in preferred embodiments of the method or system according to the present disclosure in any combination.

DESCRIPTION OF THE DRAWINGS

The specific features, aspects and advantages of the present disclosure will be better understood with regard to the following description and accompanying drawings, where.

DETAILED DESCRIPTION

Figure 1:
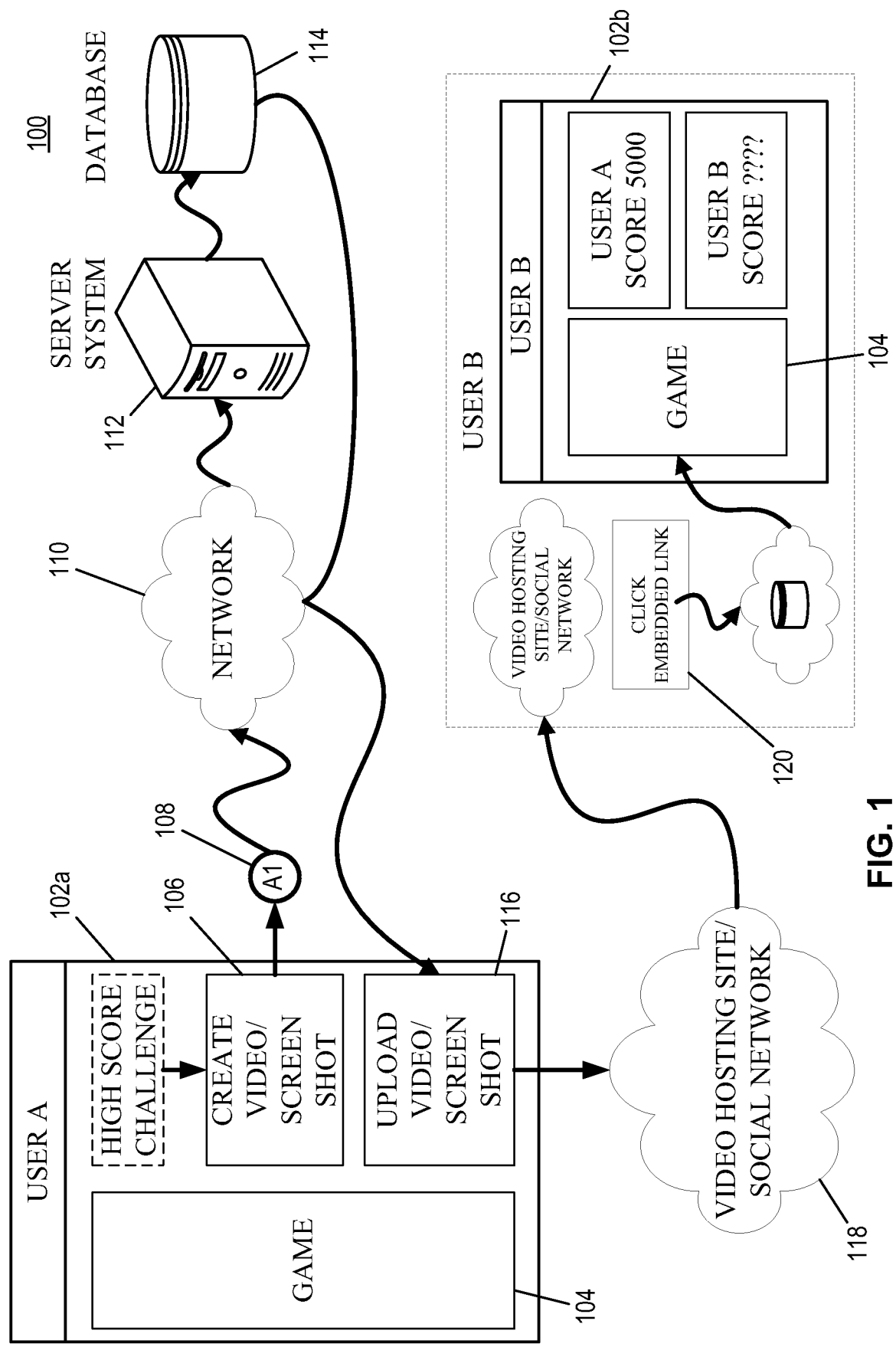
FIG. 1 shows a schematic diagram of a system according to an embodiment of the present disclosure.

In the following description, reference is made to drawings that show by way of illustration various embodiments of the present disclosure. Also, various embodiments will be described below by referring to several examples. It is to be understood that the embodiments may include changes in design and structure without departing from the scope of the claimed subject matter.

Examples of the present disclosure variously refer to online services suitable for implementing invitations according to embodiments of the present disclosure. Furthermore, online services can be used for publishing of respective invitations. Examples of online services include, but are not limited to, social networks, gaming environments, cloud-based services as well as user networks, gaming networks, online platforms, online systems, communication and networking sites, and other systems and interfaces. Online services may be accessible via a network by a plurality of users operating client devices or other remote terminals, and may enable users to share or publish online content within the online service and to participate in activities provided by the online service or locally on individual client devices. For example, each user may be connected via a client device with at least one server of a system hosting the online service. The respective server may provide users with one or more interfaces that may be provided or displayed on the client device or terminal and allow the user to interact with the online service. For example, a server may generate a personalized page that may be rendered on the client device of the user. The user may apply any interaction technique available on his or her client device, such as a mouse interaction, keyboard interaction, gesture recognition, voice recognition, or a haptic interaction, and the interaction input may be transferred to the server where it may be further processed in order to initiate a certain action. Also, the input may be processed on the client device in order to provide the server with commands or instructions to further proceed.

Accordingly, various activities for client devices may be executed on a dedicated server or an execution environment provided on the server wherein the output may be streamed to the client devices, and respective input may be received from the client devices in order to control the activity on the server. However, it is to be understood that the present disclosure is not restricted to online execution of activities or corresponding code. Rather, the present disclosure may also encompass activities that are executed locally on the client devices, such as by executing code, and the online service or another online service may be used to generate and/or distribute the invitations related to participation in the activity.

The term "participation" as used throughout this description describes an involvement of a user in the activity provided via the client device. The participation may be a collaborative participation of a plurality of users in the same activity and/or an individual participation of each user in an individual entity or instance of the activity, which may be executed independently of the other instances of the activity. For example, the activity may be a game and the game can be started on each of the client devices. Each instance of the game on the client devices can be configured according to parameters of the invitation, yet the game can be started and executed independently of other instances of the game, such as the game of the inviting user.

FIG. 1 shows a schematic overview of a system according to at least one embodiment of the present disclosure. The system 100 may allow individual users to invite other users to participate in activities, for example, to achieve the same goals or to perform better than the user. While the system 100 is discussed with regard to games or video games, it is to be understood that the present disclosure is not restricted to games and that other computer-based activities are fully encompassed by the present disclosure.

The system 100 can be used by a plurality of users, such as user A and user B, who may operate respective client devices 102a, 102b that may each execute an instance of a game 104. According to the example, user A may play a game on client device 102a and may decide to invite other users to take on and try and beat their high game score.

Client device 102a can be configured to continuously record the performance of user A in the game 104. This recording or a part of the recording may be generated with/through a toolkit, such as a software development kit (SDK), that may also be used to provide the game 104 on the client device 102a. The continuous recording can be temporarily stored, for example, in a cache or other memory of the client device 102a and at least a part of the continuous recording can be used to create a video/screenshot(s) if user A achieves a goal of the game 104, such as a personal best, as indicated in box 106. Furthermore, during the recording process of the video/screenshot(s), game metadata such as challenge information, game configuration, and other game-related data, may be collected from the game 104. Challenge information metadata may include one or more of poster, score to beat, who, when, where, time, and other information specifying the context of the game 104, the user A and/or the invited users. Game configuration metadata may include one or more of particular game, level, score, mode, content, and/or position, as well as other parameters and states of the game 104 during achievement of the goal or within a predetermined period of time before and/or after achievement of the goal.

The metadata and/or the recording including the video/screenshot(s) can be provided as metadata 108, which are also denoted as "A1" throughout examples of the present disclosure, and may be transmitted over a network 110, such as the internet, Wi-Fi, or any other suitable network connection, to a server system 112. The server system 112 may use the metadata 108 to create, set-up, and/or configure an invitation by embedding an interactive element into the recording. For example, the server system 112 may create a "click on challenge" link and embed a link into the video/screenshot(s). The recording, such as the video/screenshot(s), and/or the embedded interactive element may then be saved onto a database 114 for future retrieval and use. The invitation may be returned to client device 102a.

At this point, as indicated in box 116, user A may decide to post/upload the invitation, which may include the recording and the embedded interactive element, such as the video/screenshot(s) with an embedded link, to any publishing platform 118, such as a video hosting website or a social network, or to a plurality of online services, which may also include an online service provided by the server system 112. Additionally or as an alternative, the invitation may also refer to the recording and the embedded interactive element stored in the database 114 and the publishing platform 118 may be configured to retrieve the recording with the embedded interactive element directly from the database 114.

The invitation can be published to other users, who may then perceive the invitation, such as by watching the video/screenshot(s), and interact with the embedded interactive element, such as by clicking on the embedded "click on challenge" link as indicated by box 120. The embedded interactive element may re-direct the other user, such as user B to the server system 112 in order to directly take the user into the game and allow the user to commence playing and trying to beat the performance of user A, such as the high score of user A.

This may be achieved by providing via the server system 112 at least a part of the metadata 108, which may be addressed via the embedded interactive element and stored in the database 114, to the client device 102b of user B in order to configure and/or initiate an instance of the game 104 on the client device 102b.

Even though system 100 has been shown as including one server system 112 and one database 114, it is to be understood that the system 100 may include a plurality of server systems and a plurality of databases that can be distributed, for example, to enable load balancing and to reflect a geographical distribution of users. Similarly, even though the publishing platform 118 has been shown as a separate entity, the server system 112 and the database 114 can also form an online service including the publishing platform 118 or be linked to the publishing platform 118. However, the server system 112 and the database 114 are preferably separate from the publishing platform 118.

The system 100 and other embodiments of the present disclosure can be used to implement various use cases that illustrate the features and advantages of the present disclosure.

In a first use case, user A may have recently played game 104 and achieved a high score of 5,000 points. User A may want to challenge others to try and beat that score. A video clip may be created during their high scoring game and sent to the server system 112 that then creates the embedded link and places it in the video clip. The video clip may be saved onto the database 114 and then sent over the network 110 back to the gamer/user A. They may then upload the video clip, which could be done via a third party video sharing site or sites, such as the publishing platform 118, and/or to a network of mobile apps. Other users or challengers watching the uploaded video clip can then, if they intend to accept the challenge or invitation, click on the link in the video clip and be taken straight into the game and start playing and taking on the challenge.

In yet another use case, publishers of activities or games can create challenges and/or events for users to take part. This could be accomplished by the publisher by creating and publishing a trailer for the challenge/event, such as "kill 10,000 enemies in 24 hours win something" and/or providing a respective video/screenshot of the activity to the server system 112, that may then issue respective invitations. The trailer could be used/played at some convenient/strategic point during the activity or game. The server system 112 could be used to manage the responses of individual users to the challenge/event. The trailer could include an embedded link that could be similar to the embedded link in the recording of the activity that may allow gamers/users to directly take up the challenge simply by interacting with the embedded interactive element.

In yet another use case, a sponsor, such as an advertiser, can create branded events. The branded event could be generated by the server system 112 in a similar way as the trailer of the publisher, i.e., the advertiser could create a branded event trailer, such as "drink our drink, kill 10,000 enemies, and win a car." This type of action could be run by the server system 112 in conjunction with a publisher invitation according to a use case or as a stand-alone invitation by the advertiser concerned. In particular, the server system 112 may manage and thus provide the necessary invitations, such as links for gamers/users to use a one-click link direct into the branded event/challenge.

Figure 2:
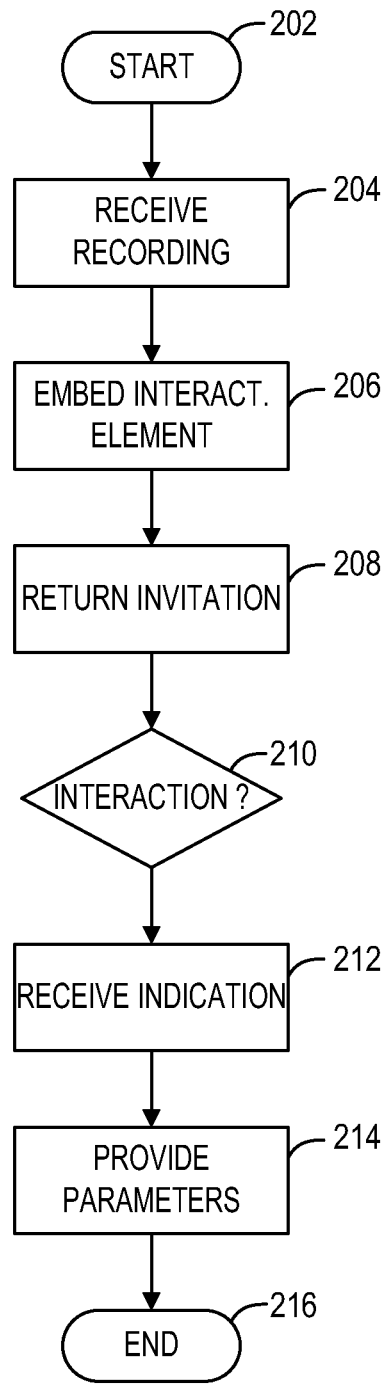
FIG. 2 shows a flowchart of a method according to an embodiment of the present disclosure.

FIG. 2 shows a flowchart of a method for inviting users to participate in activities according to one embodiment of the present disclosure. The computer-implemented method 200 may be executed by a processing component of a system, such as the server 112 of the system 100 of FIG. 1.

The method 200 may start in item 202 and may proceed with item 204, wherein a recording of at least a part of an activity provided via a first client device to a first user, and one or more parameters related to a configuration of the activity on the first client device, are received. In item 206, the recording of the activity may be enriched with an embedded interactive element to thereby generate an invitation to participate in the activity. The invitation including the recording and the embedded interactive element may be returned to the first client device in item 208. The first user of the first client device may choose to publish the invitation, for example, via a publishing platform, a social network, or using individual messages, such as emails, SMS, and others.

In item 210, the method 200 may wait for interactions of other users with the published invitation. If an interaction with the embedded interactive element in the invitation takes place (e.g., an interaction of a second user with the embedded interactive element on a second client device), a respective indication of the interaction may be received in item 212. In item 214, one or more parameters may be provided to initiate the activity on the second client device according to the configuration. For example, the one or more parameters may be provided to the second client device. The method 200 may end in item 216.

Even though methods according to various embodiments and examples of the present disclosure may have been discussed in a sequential order, it is to be understood that the individual method steps can be performed in any suitable processing order sequentially or in parallel. Furthermore, individual method steps can be omitted or modified, and further method steps can be added in order to accomplish the functionality as defined or suggested by embodiments and examples of the present disclosure, and such adapted methods are also fully encompassed by the present disclosure.

Figure 3:
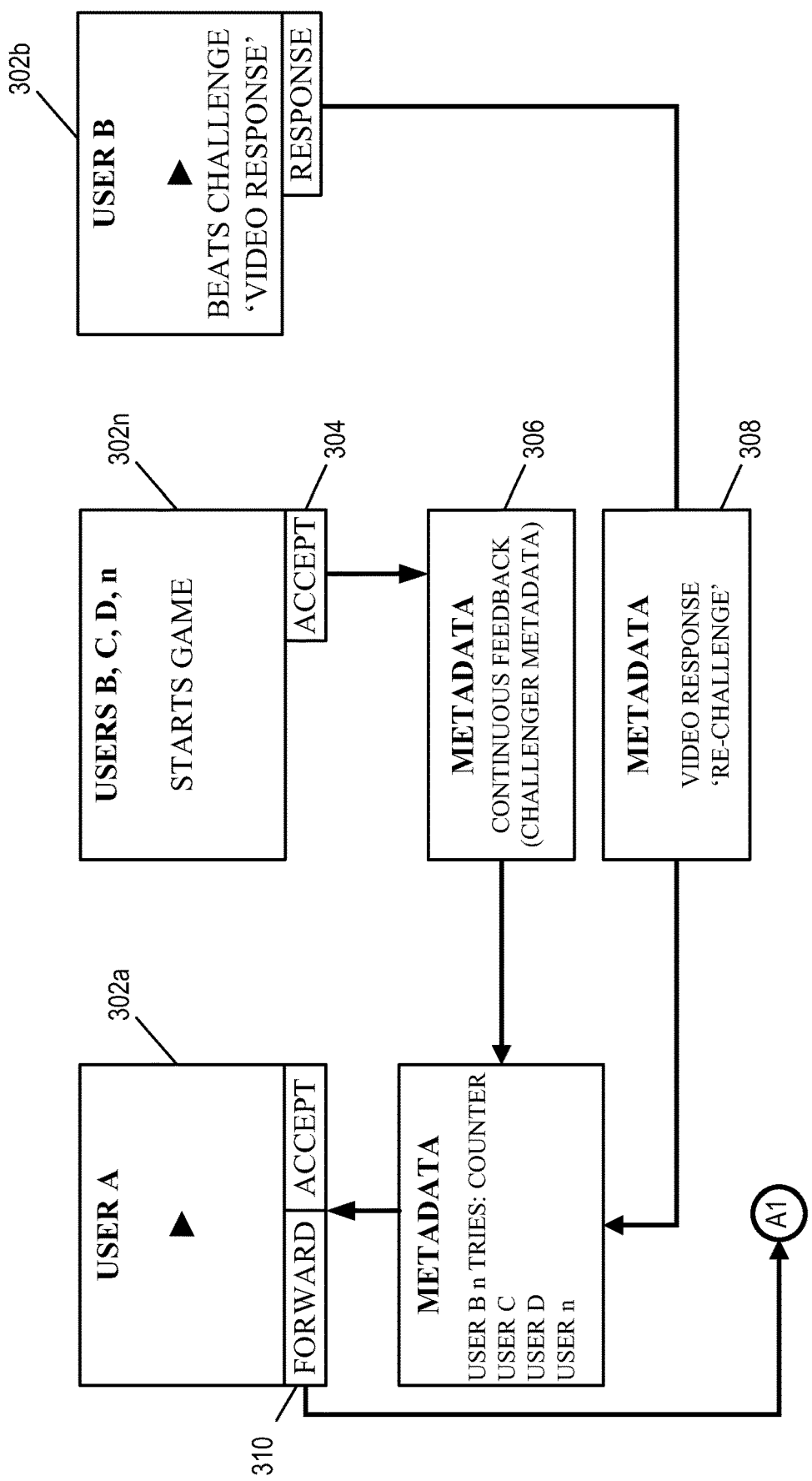
FIG. 3 illustrates a message flow of invitations according to an embodiment of the present disclosure.

FIG. 3 shows a schematic diagram of a communication flow related to invitations to participate in activities according to embodiments of the present disclosure. The diagram illustrates an interaction between a plurality of users, such as user A, who may be a challenger 302a, user B, who may be a challengee 302b, and/or a plurality of other users 302n, such as users B, C, D, n, who may be regarded as further challengees. The challenger 302a may set-up or offer a challenge to other users 302n, 302b. User B 302b may accept the challenge and may start the challenge by interacting with an interactive element embedded in a recording of performance of the challenger 302a in the activity, such as a game, for example, by clicking on an accept button 304, that may be attached to a video or a video link related to the challenge of the challenger 302a. This interaction may start the activity or game for challengee 302b. Metadata 306, which could represent metadata of the challengee 302b may be continuously fed back to the challenger 302a, for example, via an online system. The metadata 306 could preferably include a number of trials the challengee 302b had made in trying to achieve the performance of the challenger 302a, such as beating the challenger's high score, and could additionally or as an alternative, include further data related to parameters or a state of the activity or game.

On achieving the performance of the challenger 302a by challengee 302b, such as on beating the challenger 302a's high score, the system may generate an automatic re-challenge response 308, which may be sent to the original challenger 302a and to the further users 302n.

This may also be considered as metadata and could be sent to the challenger 302a as a "re-challenge" response. The challenger 302a could then respond by accepting the challenge, for example, by interacting with an interactive element embedded into a recording of the performance of the challengee 302b in the activity or game to thereby accept the further challenge.

It is to be understood that even though FIG. 3 shows a mutual challenge between user A and user B, any of the other users 302n could also join the challenge, thereby generating a network of challenges and re-challenges published to all involved users. Furthermore, the challenges and re-challenges can be repeated any number of times, thereby generating a cycle of invitation and re-invitations.

Further to publishing the invitation of the challenger 302a to the plurality of users 302n, the challenger 302a may also publish the invitation to an unlimited and unknown group of users, for example, by using a "forward" interactive element 310. This can also be regarded as sending the invitation "viral." In this example, the invitation or challenge could be sent to all contacts of the challengers 302a and thus would create a social graph of challengees and challengers. The invitation and the involved parameters are denoted as "A1" and may correspond to the metadata 108 in FIG. 1.

Figure 4:
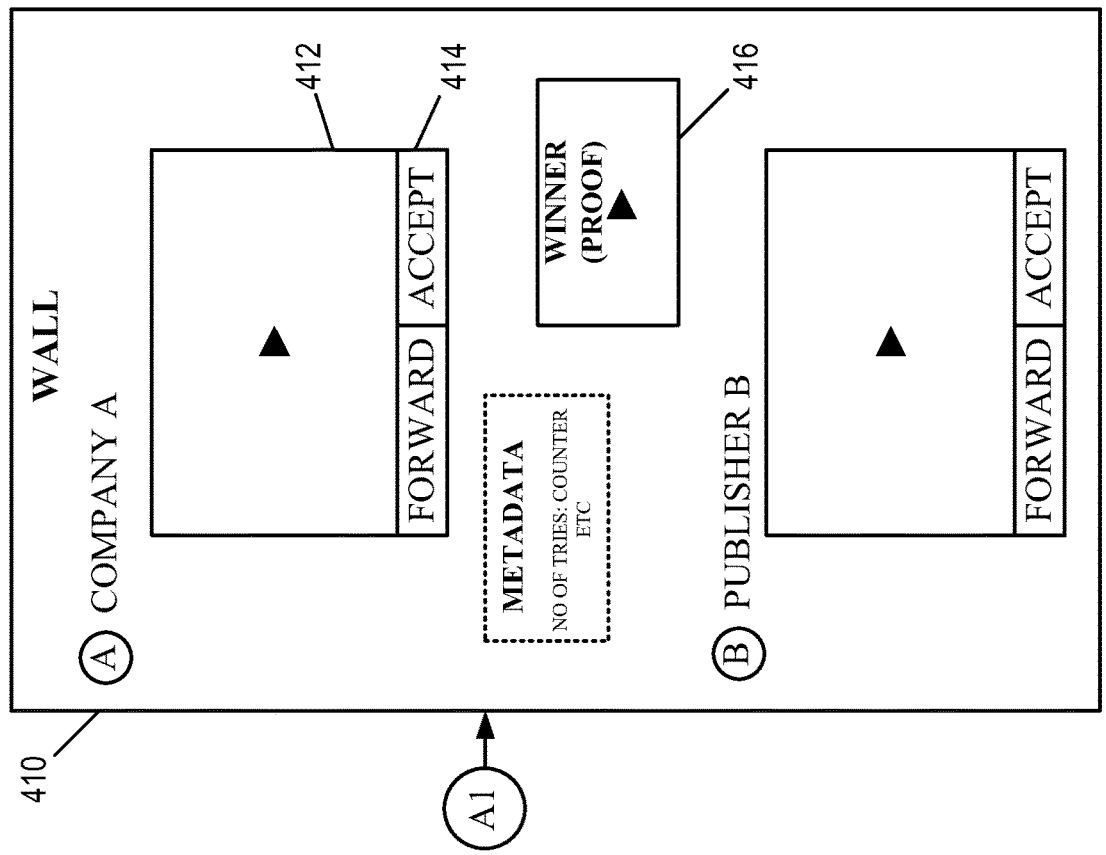
FIG. 4 shows user interfaces according to exemplifying embodiments of the present disclosure.
Figure 4:
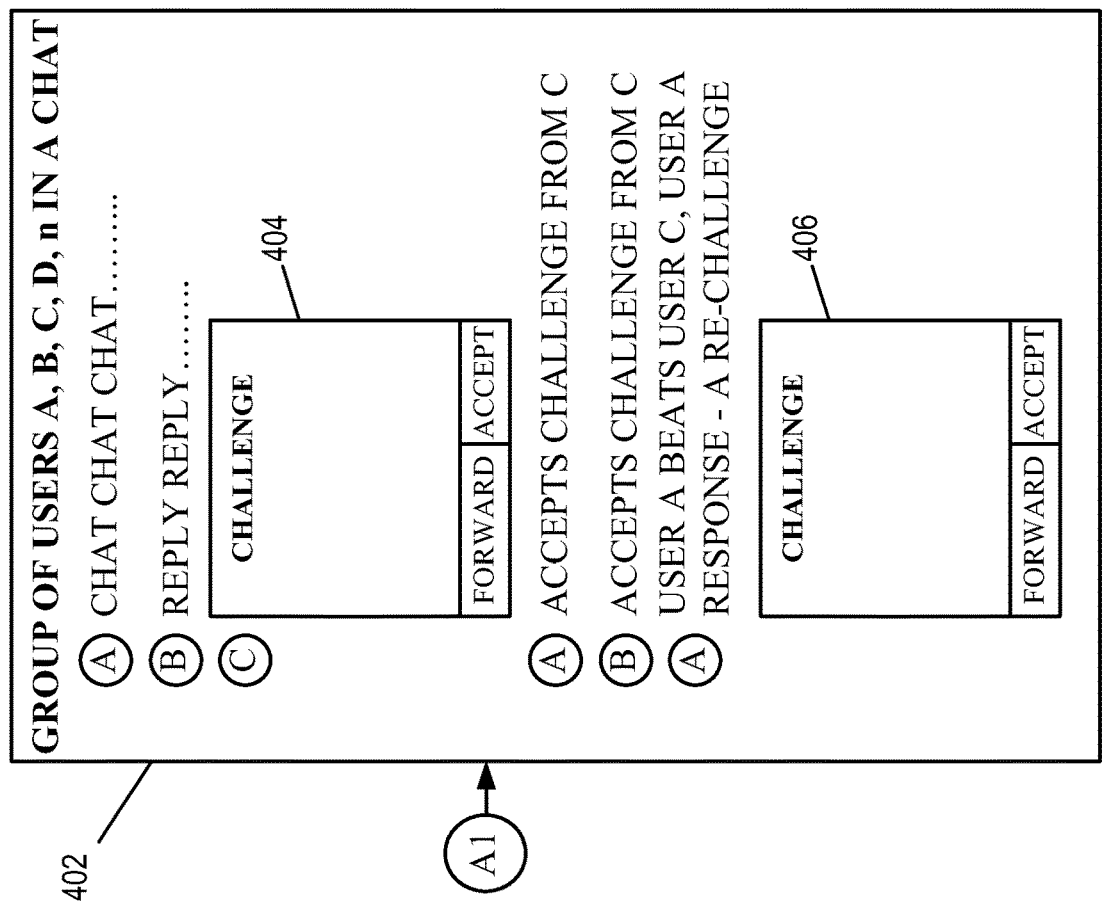

FIG. 4 shows user interfaces according to exemplifying embodiments of the present disclosure.

In a first user interface 402, a user could initiate a communication channel based on an invitation to participate in an activity, which may turn the invitation or challenge into a chat. The chat may involve a plurality of users A, B, C, D, n participating in the chat via the interface 402. At some point during the chat, one of the users, such as user C, may offer up an invitation or challenge 404 to those in the chat. The invitation or challenge 404 may be based on metadata "A1" which may be generated by user C according to embodiments of the present disclosure, such as, for example, metadata 108 described with regard to FIG. 1, and which may be converted into the invitation or challenge 404. Another user, such as user A, may accept the invitation or challenge 404, and the game may be initiated and started according to the parameters "A1" provided with the invitation or challenge 404 in order to begin the challenge, as described previously with regard to embodiments of the present disclosure.

Further metadata or invitations could be provided resulting in a re-challenge response 406 once the challengee, user A, has beaten the high score of the original challenger, user C. The re-challenge may be directed to the original challenger, user C. However, the re-challenge could also be perceived and accepted by the other participants of the chat.

Another interface 410 of FIG. 4 may represent a virtual wall, board, or pinboard-type of entity suitable for publishing invitations according to embodiments of the present disclosure. A challenger could pin an invitation or challenge 412 to the interface 410 and may wait for challengees to take up the challenge. Interested users could accept the challenge 412 by interacting with an embedded interactive element, such as an accept button 414. This may initiate the activity or game on the client device of the respective challengee as described previously with regard to embodiments of the present disclosure.

The interface 410 and the functionality could also be used by organizations, such as companies or publishers to pin invitations or challenges, competitions, etc., to the interface 410. A re-invitation or re-challenge of the challengee could be presented on the interface 410 as a proof 416 of the challengee beating a high score or successfully doing whatever was required to win the invitation, challenge or competition. The proof 416 could be presented in the form of a recording of the activity, such as a video clip recording the achievement of respective goals by the challengee which could be pinned to the interface 410 for everyone else to see. In particular, the proof 416 can be an invitation generated according to embodiments of the present disclosure.

FIGS. 5A-5D show an example of a user interface on a client device, enabling a user to manage invitations to participate in activities according to embodiments of the present disclosure. The interface may include several screens or overlays which can be activated by interacting with one of interactive elements 502.

Figure 5A:
FIGS. 5A-D show further user interfaces according to embodiments of the present disclosure.

For example, FIG. 5A shows a screen of the interface that can be activated by a "videos" interactive element 502a. The interface may include a list of recordings 504a, 504b of participations of individual users in activities, such as in a game. The recordings 504a, 504b may be, for example, video clips or screenshots taken during achievement of a particular goal of the activity, such as scoring a high score. The user operating the client device can scroll through the list of recordings 504a, 504b and may interact with the recordings to, for example, replay or manage the recordings.

Figure 5B:
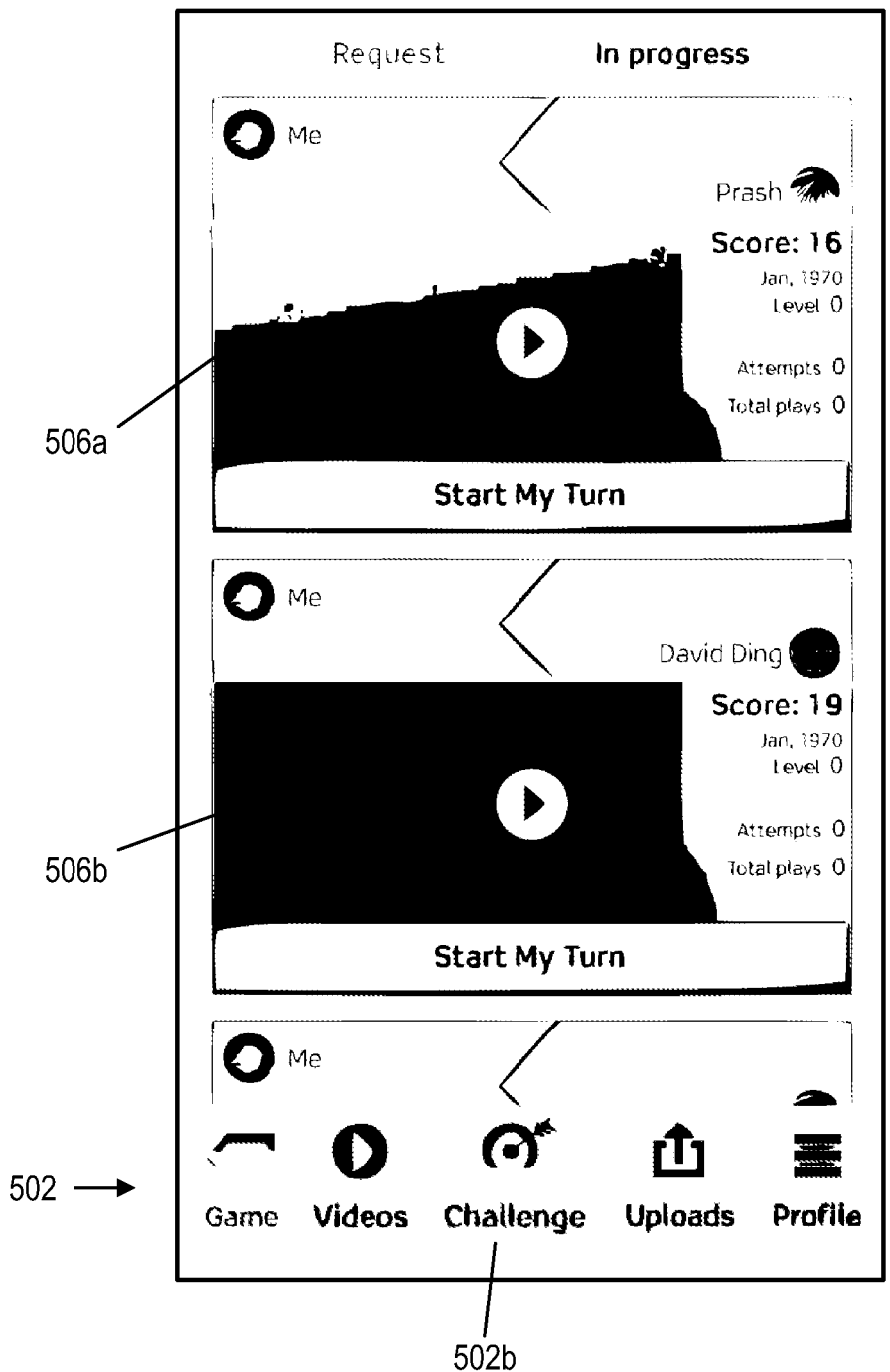

A screen of the interface shown in FIG. 5B may be activated, for example, by interacting with a "challenge" interactive element 502b. The screen may show a list of invitations or challenges 506a, 506b that may be generated according to embodiments of the present disclosure. The interface may collect any published invitation or challenge and may, for example, present the invitations or challenges 506a, 506b, which may be sorted according to the goals achieved by the individual users, thereby forming a video-based leaderboard. The invitations or challenges may be sorted in the leaderboard in a score-based fashion, for example, by ranking achievements and/or quantitative goals, and/or vote-based, such as by ranking the quality of goals, for example, cool moments, and other qualitative performances. Furthermore, leaderboards can be filtered by global coordinates, such as by using GPS, and a user of the client device may, for example, see their "standing" based on the physical location, for example, their local district, say Frankfurt, Germany, Europe.

Figure 5C:
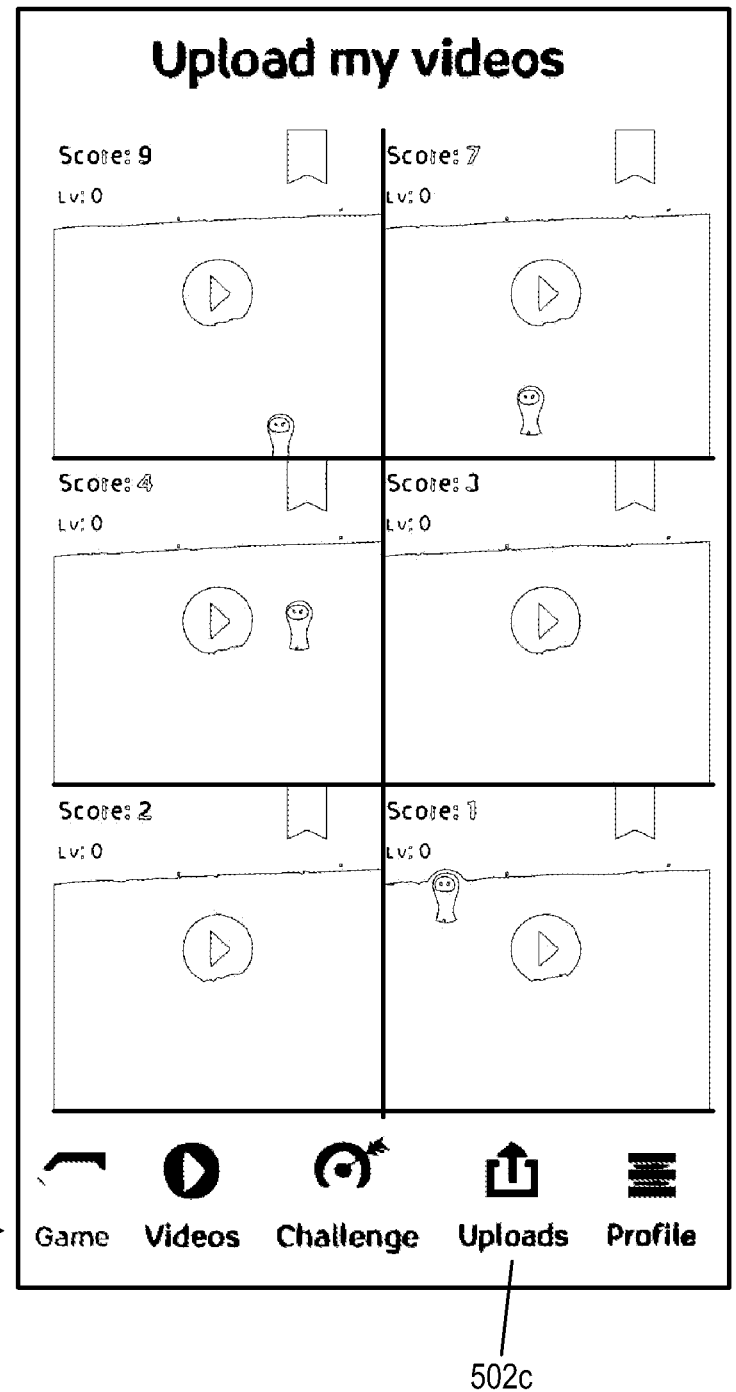

Another screen of the interface as shown in FIG. 5C may be, for example, activated by interacting with an "uploads" interactive element 502c. The screen may list various recordings of participation of the user of the client device in the activity or game that may have been processed into invitations according to embodiments of the present disclosure, and the user may individually decide to upload an invitation or video, for example, by interacting with a respective interactive element. The user may also interact with the interface to replay a recording or video of the performance and to further manage the invitations, recordings, and/or videos.

Figure 5D:
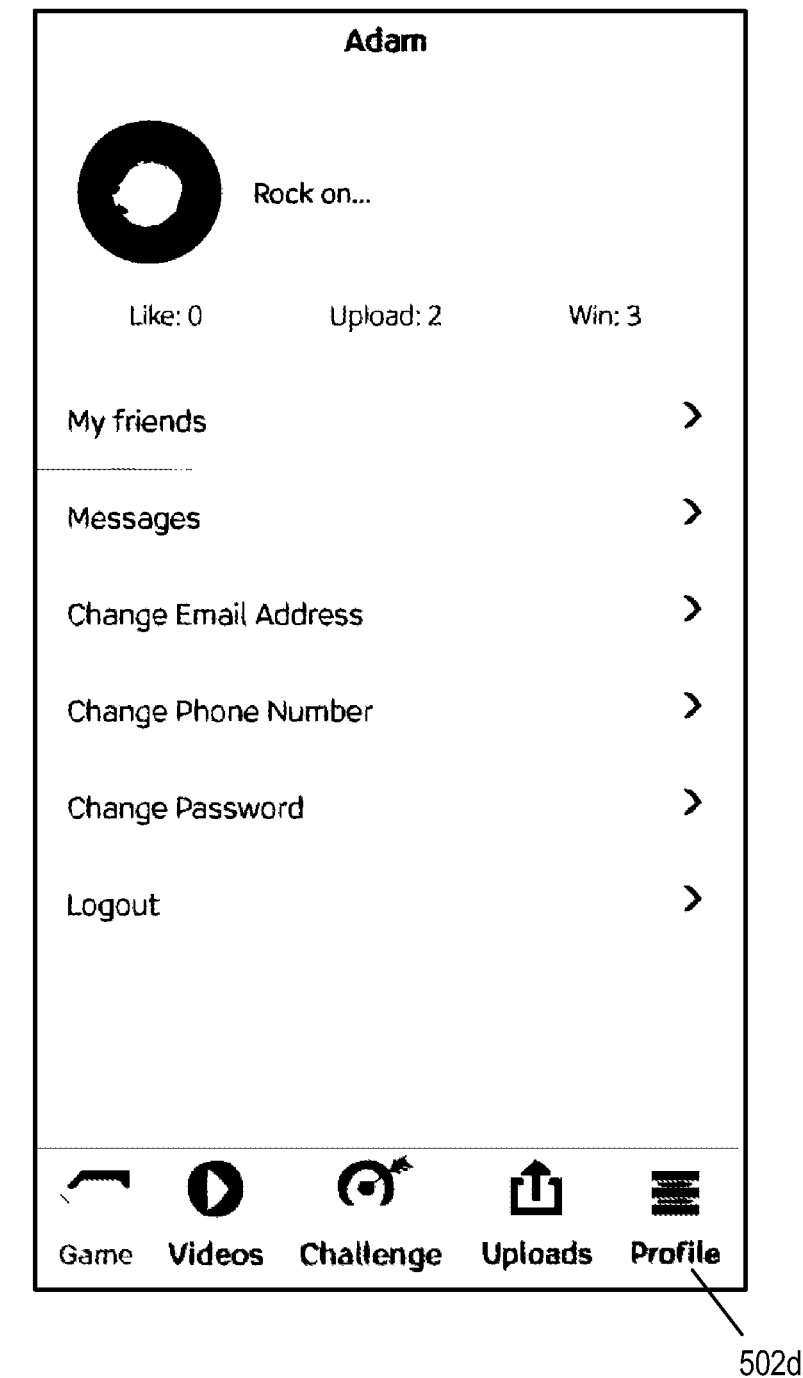

FIG. 5D shows a screen of the interface that could be activated by interacting with a "profile" interactive element 502d. Accordingly, the screen may represent a profile of the user, including the name of the user, various social statistics, a list of connected users, such as friends, messages of the user, communication parameters, such as email and phone number, and security parameters, such as a password. The profile may also allow the user to change, modify, extend, delete, and/or manage these parameters and further parameters.

The interface and individual screens of the interface shown in FIGS. 5A-5D could be provided via a client device, such as the client devices 102a, 102b of FIG. 1 in order to provide an activity, such as a game, to respective users, and in order to enable an invitation of other users to participate in the activity and/or to challenge other users to achieve the same goal or to beat the performance of the user as discussed above with regard to embodiments and examples of the present disclosure.

While some embodiments have been described in detail, it is to be understood that aspects of the disclosure can take many forms. In particular, the claimed subject matter may be practiced or implemented differently from the examples described, and the described features and characteristics may be practiced or implemented in any combination. The embodiments shown herein are intended to illustrate rather than to limit the invention as defined by the claims.

The embodiments of the invention in which an exclusive property or privilege is claimed are defined as follows:

1. A method for inviting users to participate in activities, comprising, by a server system comprising one or more server computers:

receiving from a first client device a first video recording or screenshot recording of at least a part of an activity provided via the first client device to a first user and one or more first parameters related to a configuration of the activity on the first client device;

generating a first invitation to participate in the activity by embedding a first interactive element into the first video recording or screenshot recording of the activity, wherein the first invitation to participate in the activity comprises a performance challenge for the activity;

publishing the first invitation to a second client device such that the first invitation is capable of being accepted via an interaction with the first embedded interactive element at the second client device that automatically triggers an initiation of the activity at the second client device;

receiving from the second client device an indication of the interaction of a second user with the first embedded interactive element;

providing the one or more first parameters for initiating the activity on the second client device according to the configuration;

receiving from the second client device a second video recording or screenshot recording of at least a part of the activity provided via the second client device to the second user and one or more second parameters related to the performance challenge on the second client device; and generating a second invitation to participate in the activity by embedding a second interactive element into the second video recording or screenshot recording of the activity, wherein the second invitation comprises a re-challenge for the activity.

2. The method according to claim 1, further comprising feeding back data to the first user, the data being related to said activity provided via the second client device.

3. The method according to claim 1, wherein the first invitation is published to one or more further users according to an identification of the one or more further users provided by the first user.

4. The method according to claim 1, further comprising receiving from the second client device a further video recording or screenshot recording of at least a part of the activity provided via the second client device to the second user and one or more further parameters related to a further configuration of the activity on the second client device.

5. The method according to claim 4, further comprising embedding a further interactive element into the further video recording or screenshot recording of the activity, thereby generating a further invitation to participate in the activity.

6. The method according to claim 1, wherein the first or second video recording or screenshot recording is recorded responsive to the respective user achieving at least one goal of the activity.

7. The method according to claim 6, wherein the at least one goal includes achieving a personal best of the respective user.

8. The method according to claim 6, wherein said one or more parameters reflect a state of the activity during achievement of the at least one goal.

9. The method according to claim 1, further comprising distributing the first or second invitation via one or more channels or networks to one or more further users.

10. The method according to claim 1, further comprising storing the first or second video recording or screenshot recording of the activity in an online database.

11. The method according to claim 1, wherein the activity is provided using a toolkit, said toolkit providing functionality for recording of the activity.

12. The method according to claim 1, further comprising providing code related to the activity to the second client device, wherein the code is executable on the second client device to provide the activity.

13. The method according to claim 1, further comprising embedding a further interactive element into the first or second video recording or screenshot recording of the activity, wherein the further interactive element, when activated, causes the first or second video recording or screenshot recording of the activity in which the first or second invitation is embedded to be forwarded to one or more other users.

14. The method according to claim 1, wherein the first or second interactive element is responsive to acoustic or haptic input.

15. A system comprising one or more computing devices linked to each other via a network, said system hosting an online service enabling inviting users to participate in activities, wherein the one or more computing devices are configured to:

receive from a first client device a first video recording or screenshot recording of at least a part of an activity provided via a first client device to a first user and one or more first parameters related to a configuration of the activity on the first client device;

generate a first invitation to participate in the activity by embedding a first interactive element into the first video recording or screenshot recording of the activity, wherein the first invitation to participate in the activity comprises a performance challenge for the activity;

publish the first invitation to a second client device such that the first invitation is capable of being accepted via an interaction with the first embedded interactive element at the second client device that automatically triggers an initiation of the activity at the second client device;

receive from the second client device an indication of the interaction of a second user with the first embedded interactive element; and provide the one or more first parameters for initiating the activity on the second client device according to the configuration;

receive from the second client device a second video recording or screenshot recording of at least a part of the activity provided via the second client device to the second user and one or more second parameters related to the performance challenge on the second client device; and generate a second invitation to participate in the activity by embedding a second interactive element into the second video recording or screenshot recording of the activity, wherein the second invitation comprises a re-challenge for the activity.

16. The system according to claim 15, further comprising an online database, wherein the first or second video recording or screenshot recording of the activity is stored in the online database.

17. The system according to claim 15, wherein the online service is a gaming platform enabling access to a plurality of games.

18. A system comprising one or more computing devices, said system hosting an online service enabling inviting users to participate in activities, wherein the one or more computing devices are configured to:

receive from a first client device a first video recording or screenshot recording of at least a part of an activity provided via a first client device to a first user and one or more first parameters related to a configuration of the activity on the first client device;

generate a first invitation to participate in the activity by embedding a first interactive element into the first video recording or screenshot recording of the activity;

publish the first invitation to a second client device such that the first invitation is capable of being accepted via an interaction with the first embedded interactive element at the second client device that automatically triggers an initiation of the activity at the second client device;

receive from the second client device an indication of the interaction of a second user with the first embedded interactive element; and provide the one or more first parameters for initiating the activity on the second client device according to the configuration;

receive from the second client device a second video recording or screenshot recording of at least a part of the activity provided via the second client device to the second user and one or more second parameters related to a second configuration of the activity on the second client device;

generate a second invitation to participate in the activity by embedding a second interactive element into the second video recording or screenshot recording of the activity; and receive from the first client device an indication of an interaction of the first user with the second embedded interactive element, and providing the one or more second parameters for initiating the activity on the first client device according to the second configuration.

19. The system according to claim 18, further comprising an online database, wherein the first or second video recording or screenshot recording of the activity is stored in the online database.

20. The system according to claim 18, wherein the online service is a gaming platform enabling access to a plurality of games.

21. The system according to claim 18, wherein the one or more computers are further configured to embed a further interactive element into the first or second video recording or screenshot recording of the activity, wherein the further interactive element, when activated, causes the first or second video recording or screenshot recording of the activity in which the first or second invitation is embedded to be forwarded to one or more other users.

22. The system according to claim 18, wherein the first or second interactive element is responsive to acoustic or haptic input.

23. The system according to claim 18, further comprising feeding back data to the first user, the data being related to said activity provided via the second client device.

24. The system according to claim 18, wherein the one or more computers are further configured to feed back data to the second user, the data being related to said activity provided via the first client device.

25. The system according to claim 18, wherein the first or second video recording or screenshot recording is recorded responsive to the respective user achieving at least one goal of the activity.

26. The system according to claim 18, wherein the one or more computers are further configured to distribute the first or second invitation via one or more channels or networks to one or more further users.

\* \* \* \* \*